United States Patent [19]

Hata et al.

[11] 4,060,065

[45] Nov. 29, 1977

[54] EXHAUST GAS RECIRCULATION SYSTEM HAVING MEANS TO ESTIMATE ACTUAL RECIRCULATION RATE BASED ON INTAKE AND EXHAUST GAS TEMPERATURES

[75] Inventors: Yoshitaka Hata, Fujisawa; Kenji Ikeura, Yokohama; Masaaki Ozeki, Chigasaki, all of Japan

[73] Assignee: Nissan Motor Company, Limited, Yokohama, Japan

[21] Appl. No.: 689,864

[22] Filed: May 25, 1976

Related U.S. Application Data

[63] Continuation of Ser. No. 515,061, Oct. 15, 1974, abandoned.

[30] Foreign Application Priority Data

Oct. 23, 1973 Japan .............................. 48-119239

[51] Int. Cl.² ............................................ F02M 25/06
[52] U.S. Cl. ............................... 123/119 A; 123/1 R
[58] Field of Search ................................. 123/119 A, 1

[56] References Cited

U.S. PATENT DOCUMENTS

| 3,605,709 | 9/1971 | Nakajima et al. | 123/119 A |
|---|---|---|---|
| 3,636,934 | 1/1972 | Nakajima et al. | 123/119 A |
| 3,800,764 | 4/1944 | Goto et al. | 123/119 A |
| 3,835,827 | 9/1974 | Wolgemuth | 123/119 A |

Primary Examiner—Wendell E. Burns

[57] ABSTRACT

The recirculation rate estimation means comprises three temperature sensors to respectively measure temperatures of intaken air, recycled exhaust gas and resulting mixture, and an analog computing unit to produce a signal representing an actual recirculation rate based on the temperature data and predeterminate specific heat values of the respective gases.

3 Claims, 2 Drawing Figures

EXHAUST GAS RECIRCULATION SYSTEM HAVING MEANS TO ESTIMATE ACTUAL RECIRCULATION RATE BASED ON INTAKE AND EXHAUST GAS TEMPERATURES

This is a continuation, of application Ser. No. 515,061, filed Oct. 15, 1974 now abandoned.

This invention relates generally to exhaust gas recirculation systems of internal combustion engines and more particularly to measurement of actual exhaust recirculation rate in such systems.

Exhaust gas recirculation systems are now prevailing in the art of internal combustion engines to reduce the atmospheric exhaust emission of nitrogen oxides. In these systems, a portion of exhaust gas is recycled into the induction system of the engine in order to reduce peak burning temperatures in the combustion chambers and hence formation of nitrogen oxides. As is known, it is necessary to control the quantitative ratio of the recycled exhaust gas to fresh gas being introduced into the induction system, viz., the recirculation rate, either at a constant rate or at a variable rate depending on the engine operation conditions, so that a recirculation system may attain best efficiency without causing engine efficiencies to be unduly lowered. Accordingly, actual flow rates of the induction charge and the recycled exhaust gas must be measured. These flow rates have thus far been measured exclusively by conventional gas flow meters. These flow meters, however, have a shortcoming from the practical viewpoint that they are liable to be contaminated during long use by gases, especially by the exhaust gas, and show noticeable decline of their measurement accuracy.

It is accordingly a general object of the present invention to provide an exhaust gas recirculation system having a novel means to estimate an actual recirculation rate and to produce a signal representing the estimated rate, which means can operate with good accuracy for a long period even under the influence of contaminating exhaust gas.

According to the invention, an exhaust gas recirculation system includes a means to estimate an actual exhaust recirculation rate comprising: means to measure the respective temperatures of fresh gas being introduced into the induction system of the engine, recycled exhaust gas and the resulting mixture of the two gases, and to produce three electric signals respectively representing the measured temperatures; and means to produce a fourth electric signal representing the actual exhaust recirculation rate based on the three temperature signals and known specific heat values of the respective gases. The fourth signal is fed to a conventional control unit which controls a fluid circuit for recirculating a portion of the exhaust gas from the exhaust system of the engine to the induction system. The means to produce the fourth signal is preferably an analog computing unit having a plurality of operational amplifiers.

The invention will be fully understood from the following detailed description of a preferred embodiment thereof when taken in conjunction with the accompanying drawing, in which.

The invention contemplates estimation of the mass ratio of two gases being mixed with each other from the temperatures of the respective gases and the resulting mixture.

When a gas is mixed with another gas having a temperature higher than that of the former gas, the relationship between the temperature of the resulting mixture and quantities of the respective gases can be expressed by the following well known equation:

$$Q \cdot C_a \cdot T_a + q \cdot C_e \cdot T_e = (Q + q)C_m \cdot T_m \qquad 1.$$

where: $Q$ and $q$ (kg/min) are flow rates of the first and second gases to be mixed, respectively: $C_a$, $C_e$ and $C_m$ (kcal/kg.° C) are specific heat values at constant pressure of the first, second and mixed gases, respectively: and $T_a$, $T_e$ and $T_m$ (° C) are temperatures of the same gases.

The equation (1) can be transformed into the following equation:

$$\frac{q}{Q} = \frac{T_m - \frac{C_a}{C_m} \cdot T_a}{\frac{C_e}{C_m} \cdot T_e - T_m} \qquad (2)$$

The left side term $q/Q$ is the quantitative ratio of the second gas to the first gas. Since the specific heat values $C_a$, $C_e$ and $C_m$ can be regarded as known factors, $q/Q$ can be calculated if the temperatures $T_a$, $T_e$ and $T_m$ are given.

Assume that the above first gas is a fresh gas being introduced to the induction system of an engine (which fresh gas is air when the exhaust gas is recycled to an air-cleaner, but an air-fuel mixture when recycled to the intake ports of the engine) and the second an exhaust gas being recycled to the induction system, and the term $q/Q$ represents the exhaust recirculation rate.

The specific heat value $C_m$ of the mixture resulting from exhaust gas recirculation can be calculated since both the specific heat value $C_a$ of air (or an air fuel mixture) and that of an exhaust gas $C_e$ are known. The following table represents some values of $C_a$ and $C_e$ taken from "Nainen Kikan Kogaku (Internal Combustion Engine Engineering)" by M. Awano, Tokyo (1963). The $C_e$ values are for an exhaust gas resulting from an air-fuel mixture of a stoichiometric mixing ratio.

| Temperature (° C) | Specific Heat (kcal/kg° C) | |
|---|---|---|
| | Ca (Air) | $C_e$ (Exhaust gas) |
| 10 | 0.240 | |
| 20 | 0.240 | |
| 30 | 0.241 | |
| 40 | 0.242 | |
| 50 | 0.242 | 0.255 |
| 100 | | 0.257 |
| 150 | | 0.260 |

From these data and the fact that the temperatures of the recycled exhaust gas and hence of the resulting mixture to be fed to the induction system lie in relatively narrow ranges, e.g., 100° - 150° C and 40° - 50° C, respectively, both $C_a/C_m$ and $C_e/C_m$ in the equation (2) may be regarded as 1.0 to a practical approximation. Then the exhaust recirculation rate can be expressed by the following approximation:

$$\frac{q}{Q} = \frac{T_m - T_a}{T_e - T_m} \tag{3}$$

Figure 1:
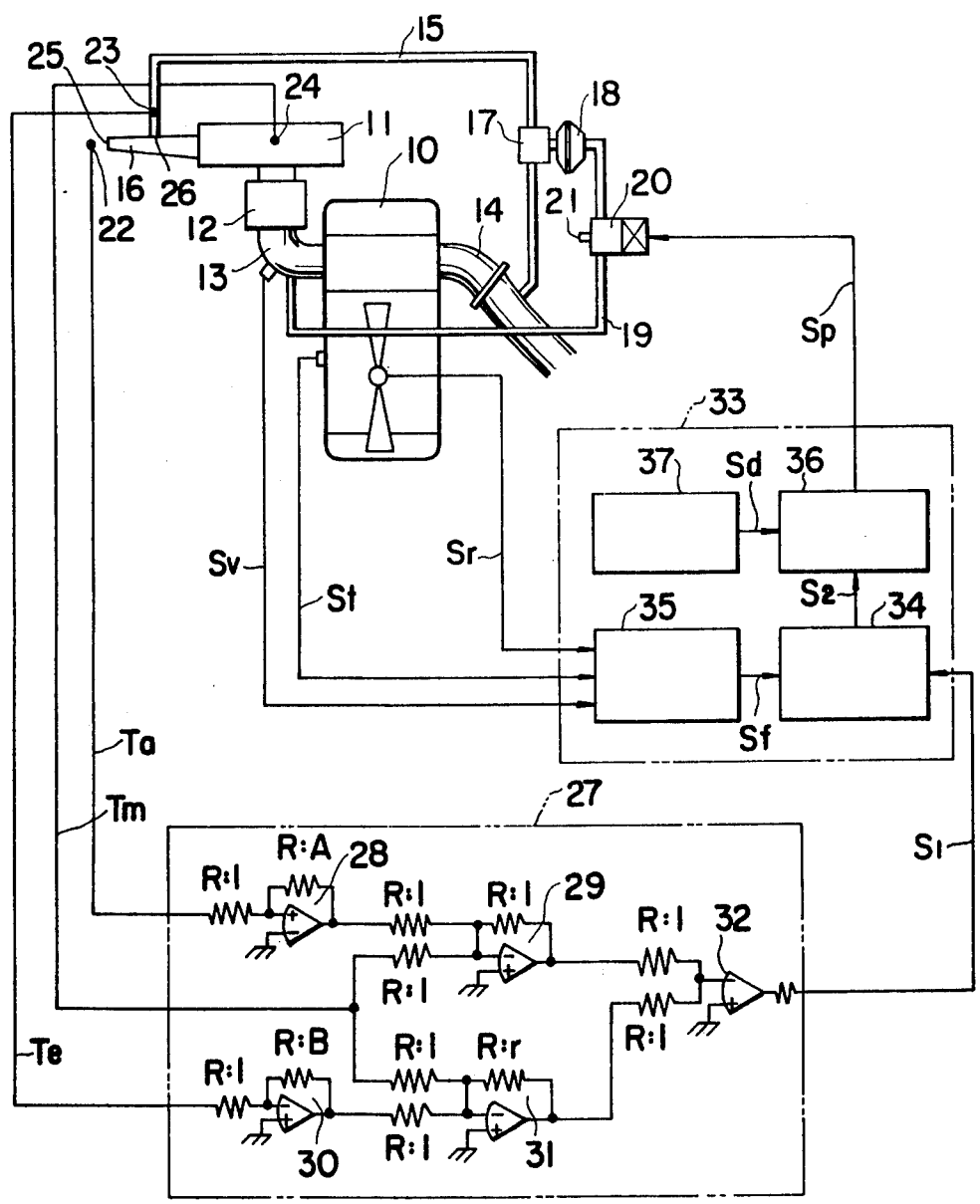
FIG. 1 is a diagram of a system according to the invention.

Referring now to the FIG. 1, a preferred embodiment of the invention is applied to an internal combustion engine 10 having an air-cleaner 11, a carburetor 12, an induction duct 13 and an exhaust duct 14. A fluid circuit of this embodiment essentially consists of a recirculation conduit 15 connecting the exhaust duct 14 to an air intake duct 16 upstream of the air-cleaner 11, a control valve 17 disposed in the conduit 15, an actuator 18 for the valve 17, a conduit 19 to cause the actuator 18 to be exposed to vacuum in the induction duct 13 and a solenoid valve 20 regulating the vacuum exerted on the actuator 18. The valve 20 allows the conduit 19 to communicate with the atmosphere through a port 21 and regulates the vacuum exerted on the actuator 18 by the variation in the opening thereof in response to a signal $S_p$ from a control unit 33, which will be described hereinafter. It will be understood that the above construction is quite common and popular in the art of exhaust gas recirculation, and accordingly any more detailed description will be unnecessary.

According to the invention, three temperature sensors such as, e.g., thermocouples 22, 23 and 24 are provided adjacent to an inlet 25 of the intake duct 16, in the recirculation conduit 15 at a location close to a junction 26 thereof with the intake duct 16 and in the air-cleaner 11, respectively, to measure the temperature $T_a$ of the introduced air, $T_e$ of the recycled exhaust gas and $T_m$ of the resulting mixture of the air and exhaust gas.

The recirculation system of the Figure further comprises an analog computing unit 27 to which the detected gas temperatures are given as electric signals $T_a$, $T_e$ and $T_m$. In the circuit diagram of the unit 27, annexed letters A, B, r and 1(one) to each resistor R represent relative resistance values thereof. A first operational amplifier 28 receives the signal $T_a$ and gives an output of the magnitude of $-A \cdot T_a$, and a second amplifier 29 adds this output to the signal $T_m$ to produce an output corresponding to $-T_m + A \cdot T_a$. A third amplifier 30 receives the signal $T_e$ and amplifies it to $-B \cdot T_e$, and a fourth amplifier 31 receives this output $-B \cdot T_e$ together with the signal $T_m$ to give an output representing $r(-T_m + B \cdot T_e)$. A fifth amplifier 32 is fed with the outputs of the second and fourth amplifiers 29 and 31 to produce an output $S_1$ corresponding to $$\frac{T_m - A \cdot T_a}{B \cdot T_e - T_m}.$$

A resistor (no numeral) on the output side of the final amplifier 32 may have an optional value to adjust the level of the signal $S_1$ as an input to the control unit 33. The resistance values A and B may be chosen as $$A = \frac{C_a}{C_m}$$

and $$B = \frac{C_e}{C_m}$$

when the equation (2) is employed for estimation of the recirculation rate $q/Q$ or $A = B = 1$ if the equation (3) is used. Thus, the output $S_1$ of the computing unit 27 represents an actual exhaust recirculation rate in the above described fluid circuits.

The aforementioned control unit 33 does not fundamentally differ from conventional control units for the same purpose when an actual recirculation rate is measured by means of flow meters. A comparator 34 of the control unit 33 receives the signal $S_1$ from the computing unit 27 and compares the signal $S_1$ with a functional signal $S_f$ provided from a function generator 35. The function generator 35 is fed with input signals representing certain data relating to the running condition of the engine 10, e.g., an engine speed signal $S_n$, intake vacuum signal $S_v$ and engine temperature signal $S_t$, and produces the functional signal $S_f$ representing a best exhaust recirculation rate under the engine operation condition estimated from the input data $S_m$, $S_v$ and $S_t$. Thus, it will be understood that the function generator 35 is fundamentally identical with computors employed in currently prevailing electronic fuel injection control systems, for example, as described in the Proceedings of the Institute of Mechanical Engineers, Automobile Division, Vol. 185, p. 95 (Sept., 1971) and C61/72 (Sept., 1972). The comparator 34 produces an output signal $\pm S_2$ which is proportional to a plus or minus deviation of the signal $S_1$ from the signal $S_f$. An adder 36 is continuously fed with an oscillating voltage signal or dither $S_d$ in the form of, e.g., continuous sawtooth wave generated by a dither generator 37 and receives the output $S_2$ of the comparator 34. In the adder 36 the dither $S_d$ is superposed on the signal $S_2$ to form a pulse signal $\pm S_p$ having a time duration corresponding to the magnitude of the signal $S_2$.

The solenoid valve 20 is operated by the thus produced signal $S_2$ in a well known manner to regulate the magnitude of vacuum on the actuator 18 through the conduit 19. For example, the valve 20 may work vibrationally so as to enlarge the opening thereof by a $+S_p$ and to diminish it by $-S_p$.

The exhaust recirculation rate is varied by the thus controlled operation of the actuator 18, and the charge temperature $T_m$ changes naturally. The changed temperature $T_m$ is repeatedly fed back to the computing unit 27 until the deviation of the signal $S_1$ becomes zero, which means accomplishment of a desired exhaust recirculation rate under the particular engine operation condition.

Figure 2:
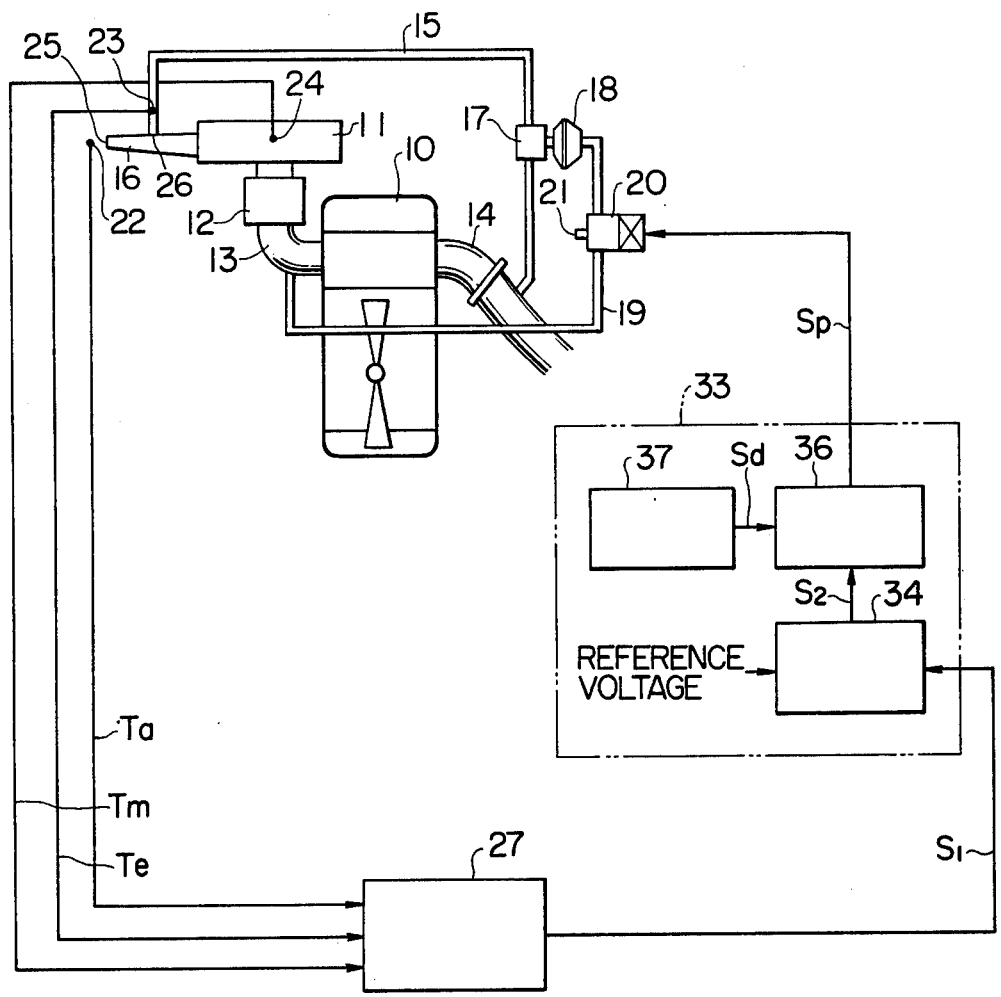
FIG. 2 is a diagram of a system which is similar to FIG. 1 except for a modification of the control unit.

It will be understood that the function generator 35 may be omitted if the exhaust recirculation rate is to be controlled at a constant rate. The signal $S_1$ is simply compared with a predeterminate level of reference value in the comparator 34 as shown in FIG. 2.

As is apparent from the foregoing description, the invention can be easily applied to conventional exhaust recirculation systems without requiring fundamental modification of either fluid circuit or control means thereof. The temperature sensors 22, 23 and 24 may be chosen from various types of conventional sensors, and design of the computing unit 27 is well known in the art of automatic control. Consequently the invention can readily be applied in practice and brings about a remarkable advantage over the use of flow meters because any temperature sensor is far more resistant against contamination by exhaust gases and its good accuracy can easily be maintained for quite a long period.

What is claimed is:

1. A method of estimating the exhaust gas recirculation rate in an internal combustion engine having a recirculation passage for recirculating a portion of the exhaust gas from the exhaust line to the induction passage of the engine, so that the recirculated exhaust gas is mixed with a fresh gas which is either air or an air-fuel mixture flowing through the induction passage at a section where the recirculation passage joins the induction passage, the recirculation rate being defined by the ratio of the mass of the recirculated exhaust gas per unit time to the mass flow rate of said fresh gas in the induction passage, the method comprising the steps of:

measuring the respective temperatures of said fresh gas, the recirculated exhaust gas and a resulting mixture of said fresh gas and the recirculated exhaust gas; and computing the recirculation rate by the following equation, $$\frac{q}{Q} = \frac{T_m - \frac{C_a}{C_m} \cdot T_a}{\frac{C_e}{C_m} \cdot T_e - T_m}$$

where $q$ is the mass of the recirculated exhaust gas per unit time, Q is the mass flow rate of said fresh gas at said section of the induction passage, T is gas temperature, C is specific heat, and the subscripts $a$, $e$ and $m$ represent said fresh gas, recirculated exhaust gas and a resulting mixture, respectively.

2. A method as claimed in claim 1, wherein $$\frac{C_a}{C_m} \text{ and } \frac{C_e}{C_m}$$

in said equation are both approximated to 1.0.

3. A method as claimed in claim 1, further comprising the step of producing first, second and third electrical signals respectively representing the measured temperatures $T_a$, $T_e$ and $T_m$, the computing step consisting of the steps of:

modulating said first electrical signal representing $T_a$ to a fourth electrical signal representing $$-\frac{C_a}{C_m} \cdot T_a$$

in a first operational amplifier;
producing a fifth electrical signal representing $$-T_m + \frac{C_a}{C_m} \cdot T_2$$

from said third electrical signal representing $T_m$ and said fourth electrical signal in a second operational amplifier;

modulating said second electrical signal representing $T_e$ to a sixth electrical signal representing $$-\frac{C_e}{C_m} \cdot T_e$$

in a third operational amplifier;
producing a seventh electrical signal representing a multiple of $$(-T_m + \frac{C_e}{C_m} \cdot T_e)$$

from said third electrical signal and said sixth electrical signal in a fourth operational amplifier; and producing an eight electrical signal representing the right side term of said equation from said fifth and seventh electrical signals in a fifth operational amplifier.

* * * * *